Patented Aug. 23, 1932

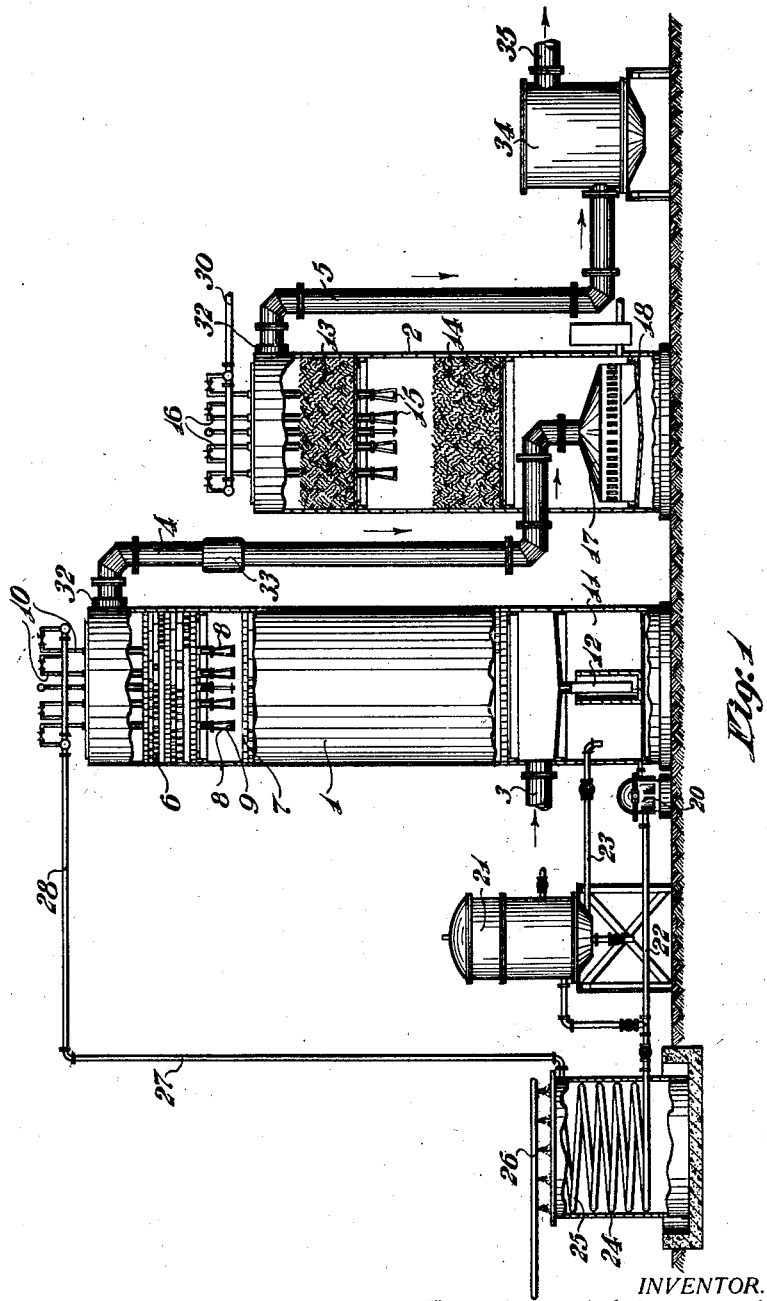

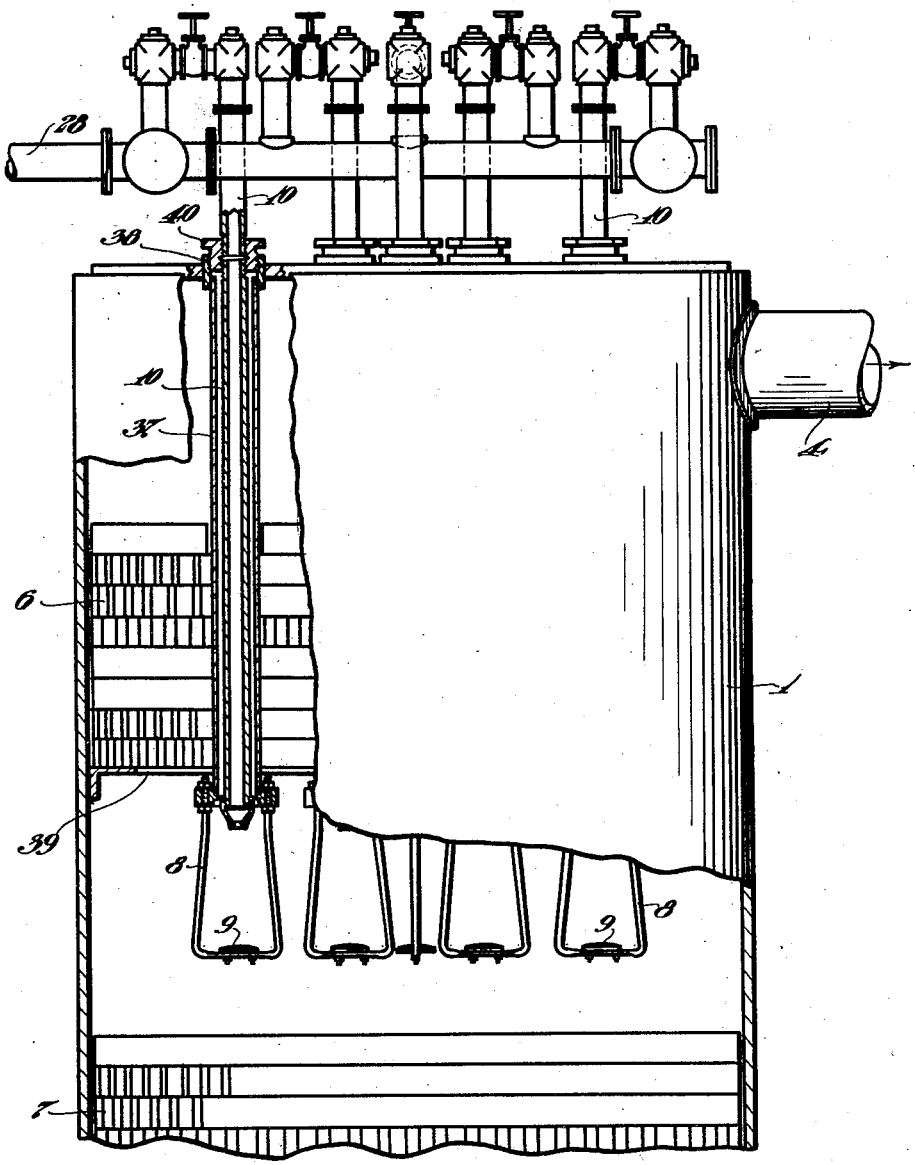

1,873,064

UNITED STATES PATENT OFFICE

FREDERICK W. SPERR, JR., OF PITTSBURGH, PENNSYLVANIA, ASSIGNOR TO THE KOPPERS COMPANY OF DELAWARE, A CORPORATION OF DELAWARE

GAS AND LIQUID CONTACT APPARATUS

Original application filed July 26, 1926, Serial No. 125,003. Divided and this application filed March 3, 1930. Serial No. 432,645.

My invention relates to apparatus for treating gas, such, for example, as coke-oven gas, water gas, fuel gases and the like, and is closely related to the apparatus shown and described in my copending application Serial No. 125,003, filed July 26, 1926, of which this application is a division.

An object of my invention is to provide simple and efficient apparatus for use in the liquid treatment of gas to remove liquid that may be entrained therein.

A further object of my invention is to provide apparatus of the character described by means of which the gas may be successively treated with liquid and any entrained liquid may be removed therefrom.

A further object of my invention is to provide apparatus for treating gas in which spray devices may be easily and conveniently assembled or inspected with respect to means for detraining liquid supplied from the spray devices and carried by the gas.

Various devices have been proposed heretofore for removing entrained moisture from air or gas but these have generally depended upon a rapid flow of the gas and relatively high inertia of the entrained drops of moisture to remove the latter, as the gas has changed its direction more or less abruptly.

In accordance with the present invention, I provide means similar to that of the usual contact apparatus for treating gas with liquid and which operates to efficiently remove entrained liquid from the gas. In general, the apparatus comprises a section of packing or hurdles located above the sprays for the usual contact material and through which the gas passes after traversing the contact material that is sprayed with liquid.

The details of my invention will be described in connection with the accompanying drawings, in which Figure 1 is a partially diagrammatic illustration of apparatus embodying my invention; and Fig. 2 is an enlarged detail view in vertical section of a portion of the apparatus of Fig. 1.

While my invention is adapted equally well for use in connection with dehydration apparatus, gas purification apparatus or other apparatus of the gas and liquid contact type, it is shown and described by way of example in connection with dehydration apparatus.

Referring particularly to Fig. 1, two scrubbing towers 1 and 2 that are connected in series are employed for dehydrating gas. Gas passes through the towers successively by means of an inlet pipe 3, a connecting pipe 4 and an outlet pipe 5 for the tower 2.

The tower 1 is provided in its upper portion with a section of wooden hurdles 6 which provide a relatively large area of contact surface. The intermediate portion of the tower is provided with a larger section of similar wooden hurdles 7. Between the sections of hurdles 6 and 7 is a group of sprays 8 of stirrup form carrying spatter plates 9.

The sprays 8, which may be secured in position in any suitable manner, are preferably supported from the top of the tower 1. The sprays 8 are supplied by means of pipes 10, which are telescopically connected thereto and which extend through the top of the tower and the section of hurdles 6. The sprays are preferably of the type shown and described in the patent to C. D. Blackburn, No. 1,597,715, dated August 31, 1926.

The bottom portion of the tower is provided with a sump 11 for collecting the dehydrating solution and which comprises a liquid seal 12 for the purpose of preventing gas from being drawn into the circulating system for the solution.

The tower 2 comprises an upper section of packing comprising metal turnings 13, which may be of either iron or steel. A similar section of turnings 14 is disposed in the central portion of the tower 2 and, as in the tower 1, a group of sprays 15, similar to sprays 8, is disposed between the sections of turnings, the sprays being connected to vertically-extending pipes 16 that extend through the turnings 13 and the top of the tower. A saturator bell 17 that is located in the bottom portion of the tower 2 and is normally immersed in dehydrating solution is connected to the pipe 4 and is provided with serrations or openings 18, through which the gas from the pipe 4 emerges in bubbles when the apparatus is in operation.

The apparatus employed in the first stage of the dehydrating process comprises the tower 1, a recirculating pump 20 that is connected to the sump 11 and an evaporator 21 that is preferably of the continuous type that is connected to the outlet pipe 22 of the pump 20 and, by means of a pipe 23, to the sump 11. A cooler 24, which is here illustrated as of the conventional type, comprising a coil 25 and a water spray 26, is in series with the pump 20 and is connected by pipes 27 and 28 to the pipes 10 for supplying the sprays 8. The dehydrating solution for the first stage is preferably a saturated aqueous solution of calcium chloride.

The apparatus employed in the second stage of the process comprises the tower 2 and a pipe 30 that is connected to a source (not shown) of a suitable supply of sulphuric acid of desired concentration.

Reference may now be had to Fig. 2, which illustrates in enlarged detail the upper portion of the tower 1, including the section of hurdles 6 and the sprays 8 extending therethrough. This portion of the tower 1 has been taken by way of example inasmuch as the corresponding portion of the tower 2 and the section 13 of metal turnings in the upper portion thereof are similar in principle and operation.

Each of the sprays 8 comprises a tubular member 37 that is secured to the top of the tower 1 in any suitable manner, as, for example, by being electrically welded to a collar 38 that is similarly secured to the top of the tower. The members 37 extend downwardly below the member 39 for supporting the section of hurdles 6. The pipes 10, which telescope with the members 37, are secured at their outer ends to the supporting means for the tubular members 37 by means of screw-threaded portions 40.

In the construction of the apparatus comprising the sprays 8 and the section of hurdles 6, the sprays are first placed in position and the hurdles are next assembled by placing them in position in suitable layers around the sprays 8. The general arrangement of the hurdles may be, for example, that shown and described in my Patent No. 1,715,253, dated May 28, 1929.

In the operation of the system shown in Fig. 1, gas saturated with water vapor flows through the inlet pipe 3 and upwardly through the tower 1 to the outlet pipe 4. The sprays 8 are supplied with any suitable dehydrating solution, such, for example, as a saturated solution of calcium chloride. The sprays 8 supply this solution to the section of hurdles 7 and the gas passes in countercurrent to the dehydrating solution.

After the gas passes the section of hurdles 7, it passes through the section of hurdles 6, which section is not supplied with dehydrating solution and which operates by contact with the gas to remove entrained drops of liquid that may be carried thereby.

The gas then passes through a spray baffle 32 at the entrance of the pipe 34 and a spray catcher 33 that operate to remove any calcium chloride spray that has not been removed by the hurdles 6. It will be understood, however, that the hurdles 6 operate efficiently to remove substantially any calcium chloride spray and that the baffle 32 and spray catcher 33 are provided as a matter of precaution, in case abnormal conditions prevail within the tower 1.

The gas then enters the saturator bell 17, from which it flows upwardly from metal turnings 14, saturated with sulphuric acid supplied by the sprays 15. The gas next engages the relatively dry turnings 13, which operate to remove substantially all of the sulphuric acid entrained in the gas.

The gas then passes out of the tower and through the pipe 5 to a magnesite box 34, where any traces of sulphuric acid are removed and thence through an outlet pipe 35, through which it may be conveyed to any suitable storage space or distribution system.

The arrangement whereby sprays of the detachable-connection type are placed below a section of hurdles or other packing material is particularly advantageous, since the connecting pipes may be withdrawn for removal of obstructions without withdrawing the stirrup portions which carry the spatter plates.

The foregoing and other advantages will be apparent to those skilled in the art to which my invention appertains.

I claim as my invention:

1. Gas and liquid contact apparatus comprising a tower having two spaced sections of hurdles therein, a plurality of sprays between said sections for spraying the lower section, pipes connected to the top of said tower and extending through the upper section for supporting said sprays, and pipes telescopically connected to the supporting pipes for supplying said sprays.

2. Gas and liquid contact apparatus comprising a tower having two superposed sections of packing, a plurality of spray devices between said sections and supported by pipes extending through said upper section, pipes telescoping with the supporting pipes and detachably connected thereto for supplying said sprays, and gas inlet and outlet means for said tower.

3. Gas and liquid contact apparatus comprising a tower for the liquid treatment of gas, a plurality of superposed sections of contact material therein, through which a current of gas is adapted to flow upwardly, and means comprising a spray of the spatter plate type below the uppermost section for spraying the other contact material with liquid and a detachable supply pipe for said spray extending through said uppermost section, whereby the uppermost section operates to remove liquid entrained by said gas.

4. Gas and liquid contact apparatus comprising a tower having two superposed spaced sections of contact material, a spray between said sections having a tubular supporting member extending through said upper section, and a pipe extending through the top of said tower that is telescopically connected to and withdrawable from said supporting member.

In testimony whereof, I have hereunto subscribed my name this 21st day of February, 1930.

FREDERICK W. SPERR, Jr.